(12) United States Patent
Chae et al.

(10) Patent No.: US 10,638,098 B2
(45) Date of Patent: Apr. 28, 2020

(54) SURVEILLANCE METHOD

(71) Applicant: HANWHA DEFENSE CO., LTD., Changwon-si (KR)

(72) Inventors: HeeSeo Chae, Changwon-si (KR); HoNam Song, Changwon-si (KR); JoonHo Park, Changwon-si (KR)

(73) Assignee: HANWHA DEFENSE CO., LTD., Changwon-si (KR)

( * ) Notice: Subject to any disclaimer, the term of this patent is extended or adjusted under 35 U.S.C. 154(b) by 0 days.

(21) Appl. No.: 15/580,591

(22) PCT Filed: Nov. 10, 2015

(86) PCT No.: PCT/KR2015/012029
§ 371 (c)(1),
(2) Date: Dec. 7, 2017

(87) PCT Pub. No.: WO2017/007077
PCT Pub. Date: Jan. 12, 2017

(65) Prior Publication Data
US 2018/0359452 A1 Dec. 13, 2018

(30) Foreign Application Priority Data
Jul. 7, 2015 (KR) .................. 10-2015-0096791

(51) Int. Cl.
*H04N 7/18* (2006.01)
*B64C 39/02* (2006.01)
(Continued)

(52) U.S. Cl.
CPC ............. *H04N 7/188* (2013.01); *B64C 39/02* (2013.01); *B64C 39/024* (2013.01);
(Continued)

(58) Field of Classification Search
CPC ........ B64C 2201/123; B64C 2201/127; B64C 39/02; B64C 39/024; G08B 13/1672;
(Continued)

(56) References Cited

U.S. PATENT DOCUMENTS

| 8,626,364 B2 | 1/2014 | Moresve |
| 2013/0099048 A1 | 4/2013 | Fisher et al. |

(Continued)

FOREIGN PATENT DOCUMENTS

| KR | 10-2011-0082141 A | 7/2011 |
| KR | 2012005387 | * 12/2012 |
| KR | 10-2013-0112688 A | 10/2013 |
| KR | 10-2014-0127574 A | 11/2014 |
| KR | 1020150010345 | * 1/2015 |
| KR | 10-1524936 B1 | 6/2015 |

(Continued)

OTHER PUBLICATIONS

International Search Report dated Mar. 31, 2016, by the International Searching Authority in counterpart International Application No. PCT/KR2015/012029 (PCT/ISA/210).

*Primary Examiner* — Md N Haque
(74) *Attorney, Agent, or Firm* — Sughrue Mion, PLLC

(57) ABSTRACT

Provided is a surveillance method.
The surveillance method includes detecting an event occurring region from an image obtained by using a first image sensor; and, when the event occurring region satisfies a preset condition, moving an identification unit on which a second image sensor is mounted in a direction corresponding to the event occurring region.

13 Claims, 18 Drawing Sheets

(51) Int. Cl.
*H04N 5/232* (2006.01)
*G08B 13/196* (2006.01)
*G08B 13/16* (2006.01)
*H04N 5/247* (2006.01)

(52) U.S. Cl.
CPC ..... *G08B 13/1672* (2013.01); *G08B 13/1965* (2013.01); *G08B 13/19695* (2013.01); *H04N 5/232* (2013.01); *H04N 5/23299* (2018.08); *H04N 5/247* (2013.01); *H04N 7/185* (2013.01); *B64C 2201/123* (2013.01); *B64C 2201/127* (2013.01); *G08B 13/19628* (2013.01)

(58) Field of Classification Search
CPC ...... G08B 13/196; H04N 5/247; H04N 7/185; H04N 7/188
See application file for complete search history.

(56) References Cited

U.S. PATENT DOCUMENTS

| | | | |
|---|---|---|---|
| 2013/0291095 A1* | 10/2013 | Cheng | G06F 21/36 726/19 |
| 2015/0092052 A1* | 4/2015 | Shin | G06K 9/00771 348/143 |
| 2016/0004914 A1* | 1/2016 | Park | H04N 7/188 382/209 |

FOREIGN PATENT DOCUMENTS

| | | | |
|---|---|---|---|
| KR | 1020150062607 | * | 6/2015 |
| KR | 10-2015-0074251 A | | 7/2015 |
| KR | 1020150074251 | * | 7/2015 |

* cited by examiner

SURVEILLANCE METHOD

TECHNICAL FIELD

The present disclosure relates to a surveillance method capable of obtaining a detailed event image by moving an identification unit based on information obtained from an image in which an event has occurred.

BACKGROUND ART

Recently, many surveillance cameras have been installed everywhere, and a technology for recording and storing an event by sensing the occurrence of the event from images obtained through the surveillance cameras has been developed.

However, such surveillance cameras are fixed on a structure such as a wall, a pillar, etc., and thus, it is difficult to obtain detailed images of an event that has occurred at a location at a predetermined distance or a greater distance from the surveillance cameras.

PRIOR ART DOCUMENT

Patent Document (Patent document 001) Korean Laid-open Patent No. 2013-0112688

DETAILED DESCRIPTION OF THE INVENTIVE CONCEPT

Technical Problem

To address the above problems, according to the present disclosure, detailed event images may be obtained by analyzing event images obtained by a surveillance camera and moving an identification unit based on an analysis result.

Also, detailed event images may be obtained through cooperation of a plurality of monitoring devices.

Technical Solution

According to an embodiment of the present disclosure, there is provided a surveillance method in a surveillance system, the surveillance method including: detecting an event occurring region from an image obtained via a first image sensor; and if the event occurring region satisfies a preset condition, moving an identification unit on which a second image sensor is mounted in a direction corresponding to the event occurring region.

The preset condition may be that a number of pixels in the event occurring region is equal to or less than a first critical number that is set in advance. The preset condition may be that a shape of an object in the event occurring region is similar to a shape stored in advance.

The surveillance method may further include: detecting an event occurring direction by using a directional sensor, wherein the detecting of the event occurring region may include: controlling a photographing direction of the first image sensor so that the first image sensor photographs an image in the event occurring direction; and detecting the event occurring region from the image obtained by the first image sensor.

The directional sensor may include one or more acoustic sensor arranged in different directions from each other, and the detecting of the event occurring direction may include calculating an energy average of acoustic signals obtained by the one or more acoustic sensors, detecting an event acoustic signal, an energy average of which is equal to or greater than a preset critical energy, and detecting a direction in which an acoustic signal corresponding to the event acoustic signal is arranged as the event occurring direction.

The surveillance method may further include: detecting an event occurring direction corresponding to the event occurring region based on the image, wherein the moving of the identification unit may include moving the identification unit on which a second image sensor is mounted in a direction corresponding to the event occurring region detected in the detecting of the event occurring direction.

The first image sensor may be provided on a fixed supporter, and the identification unit is an unmanned flying object.

The surveillance method may further include: providing a user with the event occurring region in the image obtained via the first image sensor, after expanding a corresponding part in an image obtained by using the second image sensor.

The moving of the identification unit may include: calculating a maximum moving distance of the identification unit in a direction corresponding to the event occurring region by using information about remaining energy of the identification unit; when the identification unit is moved to the maximum moving distance, estimating a number of pixels included in the event occurring region in an image obtained via the second image sensor; and when the number of pixels is equal to or less than a preset second critical number, obtaining images from one or more 1-1 image sensors and 2-1 image sensors adjacent to the first image sensor.

The surveillance method may further include: obtaining information about an arrangement state between the identification unit and the landing field by detecting a symbol from an image obtained via the second image sensor; obtaining, from the image, information about an altitude of the flying object by detecting a light intensity of a light-emitting unit provided on the landing field; and controlling the identification unit based on the information about the arrangement state and the information about the altitude.

The landing field may be provided on the supporter on which the first image sensor is fixed, the light-emitting unit may include a plurality of light-emitting devices arranged in column and row directions, and the symbol may be represented in a lighting pattern of the plurality of light-emitting devices.

The obtaining of the information about the altitude may include: detecting a light intensity of the light-emitting unit; and obtaining information about the identification unit based on a relationship between a light intensity and a distance set in advance and the detected light intensity.

According to another embodiment of the present disclosure, there is provided a surveillance method used by a surveillance system, the surveillance method including: detecting an event occurring direction via a directional sensor; moving an identification unit in the event occurring direction that is detected; and controlling a photographing direction of a first image sensor towards a direction opposite the event occurring direction.

According to another embodiment of the present disclosure, there is provided a surveillance device including: an event occurring region detector configured to detect an event occurring region from an image obtained via a first image sensor; and an identification unit mover configured to move an identification unit on which a second image sensor is mounted in a direction corresponding to the event occurring region that is detected, if the event occurring region satisfies a preset condition.

The surveillance device may further include: a direction detector configured to detect an event occurring direction via a directional sensor.

The event occurring region detector may be configured to control a photographing direction of the first image sensor to be towards the event occurring direction and to detect the event occurring region from an image obtained via the first image sensor.

The surveillance device may further include: an information provider configured to provide a user with the event occurring region in the image obtained via the first image sensor, after expanding a corresponding part in an image obtained via the second image sensor.

Advantageous Effects

According to the embodiments of the present disclosure, a method and device capable of obtaining detailed event images by analyzing event images obtained by a surveillance camera and moving an identification unit based on an analyzing result may be implemented.

Also, a method and device capable of obtaining detailed event images through cooperation among a plurality of monitoring devices may be implemented.

BEST MODE

Figure 1:
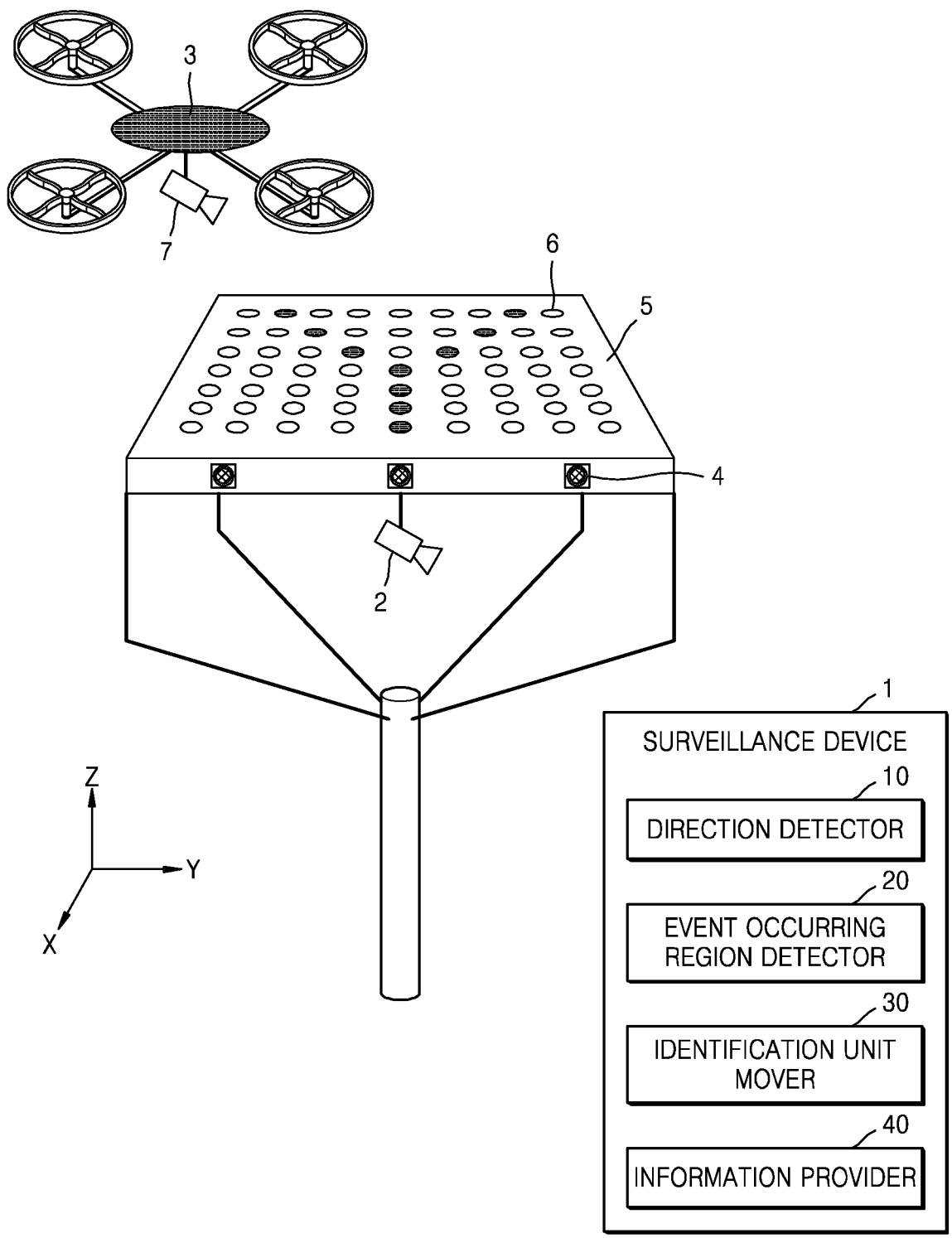
FIG. 1 is a diagram of a surveillance system according to an embodiment of the present disclosure.

As the present disclosure allows for various changes and numerous embodiments, particular embodiments will be illustrated in the drawings and described in detail in the written description. However, this is not intended to limit the present disclosure to particular modes of practice, and it is to be appreciated that all modifications, equivalents, and/or alternatives that do not depart from the spirit and technical scope are encompassed in the inventive concept. In the description, certain detailed explanations of the related art are omitted when it is deemed that they may unnecessarily obscure the essence of the present disclosure.

It will be understood that although the terms "first," "second," etc. may be used herein to describe various components, these components should not be limited by these terms. Terms are only used to distinguish one element from other elements.

The terms used in the present specification are merely used to describe particular embodiments, and are not intended to limit the present disclosure. An expression used in the singular encompasses the expression of the plural, unless it has a clearly different meaning in the context. In the present specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Some embodiments of the present disclosure may be represented as functional block structures and various processing stages. The functional blocks may be implemented as variety numbers hardware and/or software configurations executing certain functions. For example, the inventive concept may employ various integrated circuit (IC) components, e.g., memory elements, processing elements, logic elements, look-up tables, and the like, which may carry out a variety of functions under the control of one or more microprocessors or other control devices. Similarly, where the elements are implemented using software programming or software elements, the inventive concept may be implemented with any programming or scripting language such as C, C++, Java, assembler language, or the like, with the various algorithms being implemented with any combination of data structures, objects, processes, routines or other programming elements. The functional aspects may be implemented in algorithms that are executed on one or more processors. Also, the present disclosure may employ any number of conventional techniques for electronics configuration, signal processing and/or control, data processing and the like. The words "mechanism," "element," "means," and "configuration" are used broadly and are not limited to mechanical or physical embodiments. The above terms may include software routines in conjunction with processors, etc.

Referring to FIG. 1, a surveillance system according to an embodiment of the present disclosure may include a surveillance device 1, a first image sensor 2, an identification unit 3, and an identification unit mounting deck 5.

The first image sensor 2 according to an embodiment of the present disclosure may photograph a peripheral environment or scene (space), and may photograph various objects in the scene (for example, stationary objects such as buildings, trees, obstacles, etc., or active objects such as human beings, animals, etc.) Also, the first image sensor 2 may be a sensor having a restricted viewing angle such as a general camera or a sensor having a limitless viewing angle such as a fisheye camera.

The identification unit 3 according to an embodiment of the present disclosure may be a flying unit including wings or a rotor. For example, the identification unit 3 may be a fixed-wing flying object such as a general flying object or a rotary-wing flying object such as a helicopter. Otherwise, the identification unit 3 according to an embodiment of the present disclosure may be a running unit including a driving unit such as a wheel. For example, the identification unit 3 may be a running unit that may be driven by different driving units, for example, a vehicle, an armored vehicle including a caterpillar, a motorcycle, etc.

In addition, the identification unit 3 may include a second image sensor 7 for obtaining images in order to provide more detailed information to a user by photographing a region corresponding to an event occurring region in an image obtained by the first image sensor 2. Also, like the first image sensor 2, the second image sensor 7 may photograph a peripheral environment or scene (space) and may also photograph various objects in the scene (for example, stationary objects such as buildings, trees, obstacles, etc., or active objects such as human beings, animals, etc.) Also, the second image sensor 7 may be a sensor having a restricted viewing angle such as a general camera or a sensor having a limitless viewing angle such as a fisheye camera.

The identification unit mounting deck 5 according to the embodiment of the present disclosure may have various shapes according to a kind of the identification unit 3. If the identification unit 3 is a flying object such as a drone (a rotary-wing flying object having a plurality of propellers), the identification unit mounting deck 5 may have a wide surface shape for landing, and may further include an identification unit guide unit 6 for guiding landing. The identification unit guide unit 6 may include a plurality of light-emitting devices that are arranged in rows and columns. Also, the identification unit guide unit 6 may represent a symbol for the landing by using the plurality of light-emitting devices. The light-emitting device may be a light-emitting diode (LED) lamp, an infrared ray (IR) lamp, a halogen lamp, etc.

The identification unit mounting deck 5 may further include one or more directional sensors 4 for detecting a direction in which an event occurs. In addition, the identification unit mounting deck 5 may further include an energy supplying unit (not shown) for supplying energy to the identification unit.

The identification unit 3 may be connected to the surveillance device 1 via a wireless network. In this case, the wireless network may be a network of various kinds and various frequency bands such as CDMA, WIFI, WIBRO, LTE, etc.

Also, the first image sensor 2 and the identification unit mounting deck 5 may be connected to the surveillance device 1 via a wired or wireless network.

The surveillance device 1 according to the embodiment of the present disclosure may include a direction detector 10, an event occurring region detector 20, an identification unit mover 30, an information provider 40, and a landing guide unit 50. The direction detector 10 may detect an event occurring direction by using a directional sensor 4. The event occurring region detector 20 may detect a region where an event has occurred in an image obtained by the first image sensor 2. If the even occurring region satisfies a preset condition, the identification unit mover 30 may move the identification unit 3 on which the second image sensor 7 is placed in a direction corresponding to the event occurring region. The information provider 40 may provide a user with a region corresponding to the event occurring region in the image obtained by using the first image sensor 2, after expanding the region in the image obtained by using the second image sensor 7. The landing guide unit 50 may make the identification unit 3 land on the identification unit mounting deck 5.

Figure 2:
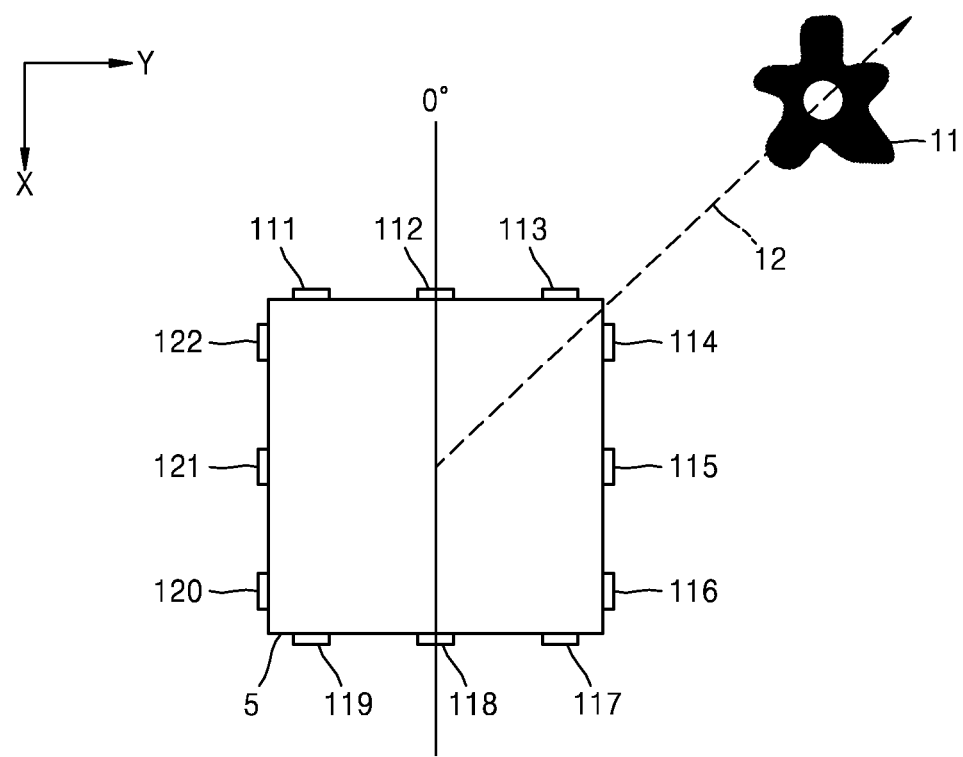
FIG. 2 illustrates processes whereby a direction detector detects an event occurring direction via a directional sensor according to an embodiment of the present disclosure.

FIG. 2 illustrates processes of detecting an event occurring direction by using a directional sensor in the direction detector 10 according to an embodiment of the present disclosure. FIG. 2 shows an example in which twelve directional sensors 111 to 122 are provided.

The plurality of directional sensors 111 to 122 may be arranged at appropriate locations for sensing the event occurring direction. FIG. 2 shows an example in which three directional sensors are respectively arranged at four corners of the identification unit mounting deck 5. That is, based on FIG. 2, directional sensors 111 to 113 are arranged at an upper portion, directional sensors 114 to 116 are arranged at a right side, directional sensors 117 to 118 are arranged at a lower portion, and directional sensors 120 to 122 are arranged at a left side, that is, the sensors are arranged at four directions to exactly detect the direction in which the event occurs.

In addition, the directional sensors 111 to 122 may be acoustic sensors, and other various sensors capable of sensing occurrence of events may be used. Hereinafter, an example in which the directional sensors 111 to 122 are acoustic sensors will be described as the embodiment of the present disclosure, but the present disclosure is not limited to the above example.

The direction detector 10 calculates an energy average of acoustic signals obtained by the directional sensors 111 to 122, and may detect an acoustic signal, the energy average of which is equal to or greater than a preset critical energy, as an event acoustic signal. Also, the direction detector 10 may detect a direction in which the acoustic sensor obtaining the event acoustic signal is arranged as an event occurring direction. The critical energy may be set by the user.

For example, in a case where an event 11 including a sound has occurred in an arrow 12 direction and the sound generated in the event is equal to or greater than the critical energy, the directional sensor 113 and the directional sensor 114 may sense an event acoustic signal, the energy of which is equal to or greater than the critical energy. In this case, the direction detector 10 may detect the event occurring direction 12 based on sensed information.

In addition, in the above example, the directional sensor 112 and the directional sensor 115 may also sense an acoustic signal, the average energy of which is equal to or greater than the preset critical energy. In this case, the direction detector 10 may detect the event occurring direction taking into account the energy of the acoustic signals detected by each of the directional sensor 112, 113, 114, and 115.

The event occurring region detector 20 according to the embodiment of the present disclosure may control a photographing direction of the first image sensor 2 so that the first image sensor 2 may photograph the event occurring direction detected by the direction detector 10. Also, the event occurring region detector 20 may detect an event occurring region from the image obtained by using the first image sensor 2.

Figure 3A:
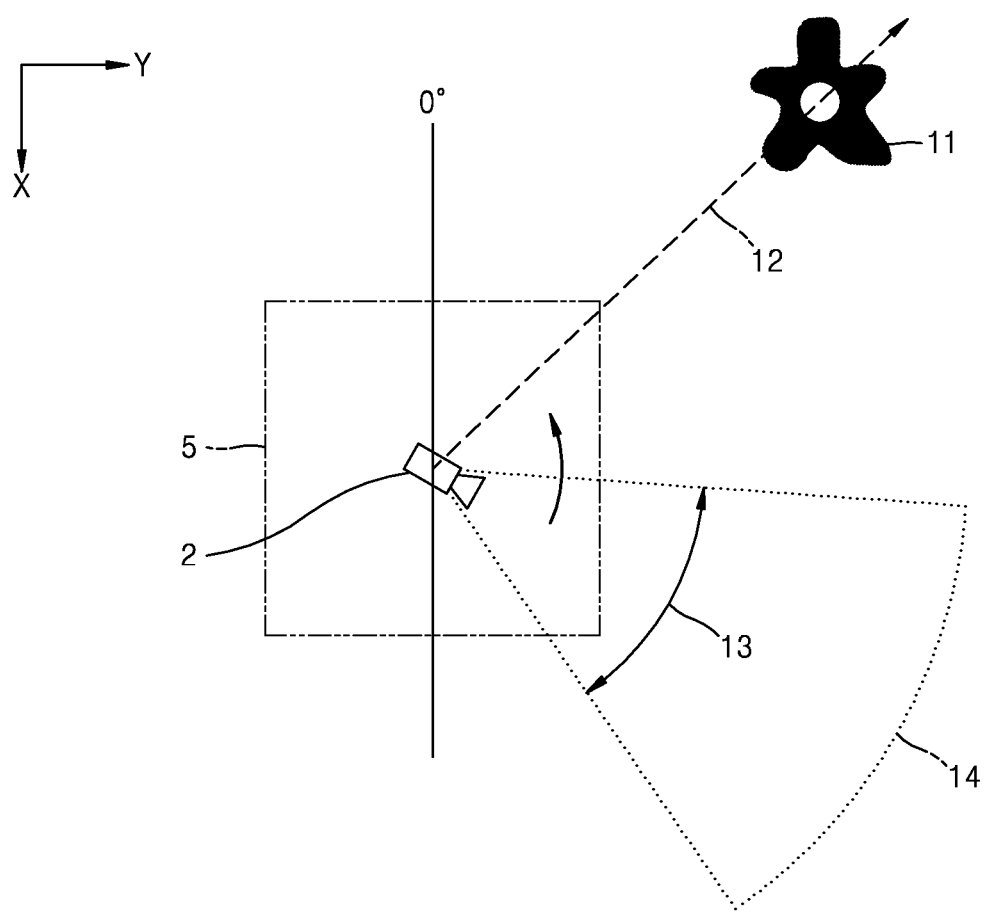
FIGS. 3A and 3B are diagrams illustrating processes whereby an event occurring region detector of FIG. 1 obtains images according to an event occurrence direction detected by a direction detector.
Figure 3B:
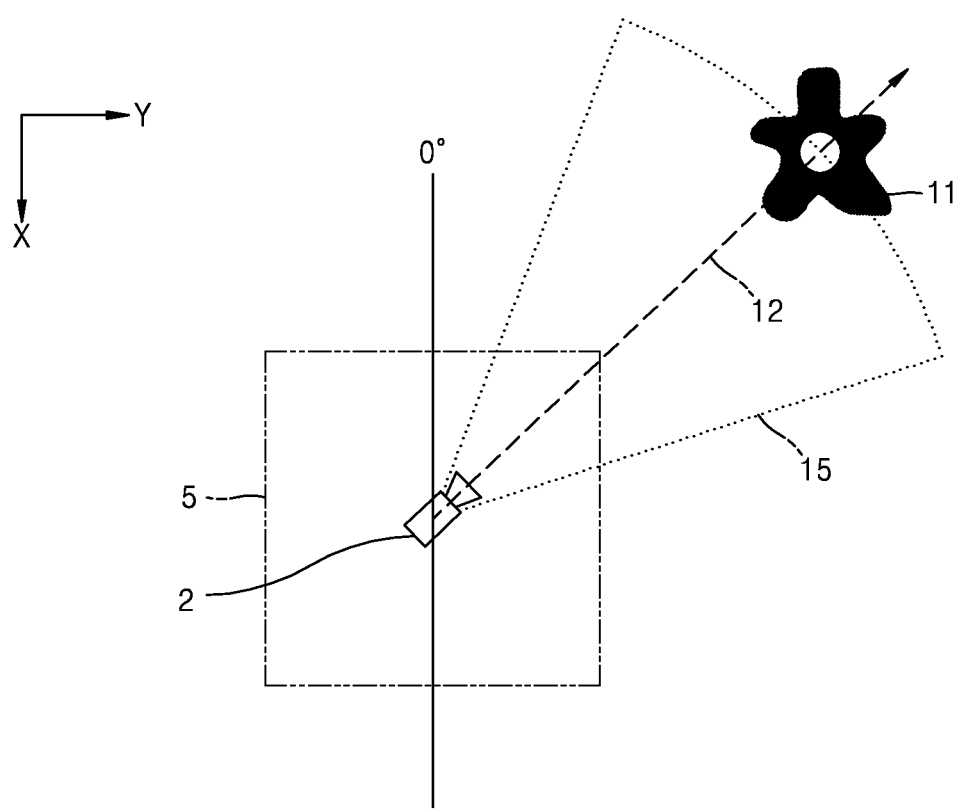

FIGS. 3A and 3B are diagrams illustrating processes whereby the event occurring region detector 20 of FIG. 1 obtains images according to an event occurrence direction detected by the direction detector 10.

Referring to FIG. 3A, it is assumed that the event 11 including the sound has occurred in the arrow direction 12, while the first image sensor 2 is photographing a direction of 150° angle (based on that −X direction is 0° angle, and rotation is in a clockwise direction.) A viewing angle 13 of the first image sensor 2 is restricted. In this case, a photographing range 14 of the first image sensor 2 may not be suitable for photographing the event 11.

The event occurring region detector 20 rotates the first image sensor 2 towards the event occurring direction 12 detected by the direction detector 10 as shown in FIG. 3B so that the first image sensor 2 may have a photographing range 15 that is suitable for photographing the event 11. Also, the event occurring region detector 20 may detect the event occurring region from an image obtained by using the first image sensor 2 having an appropriate photographing range 15.

Figure 4A:
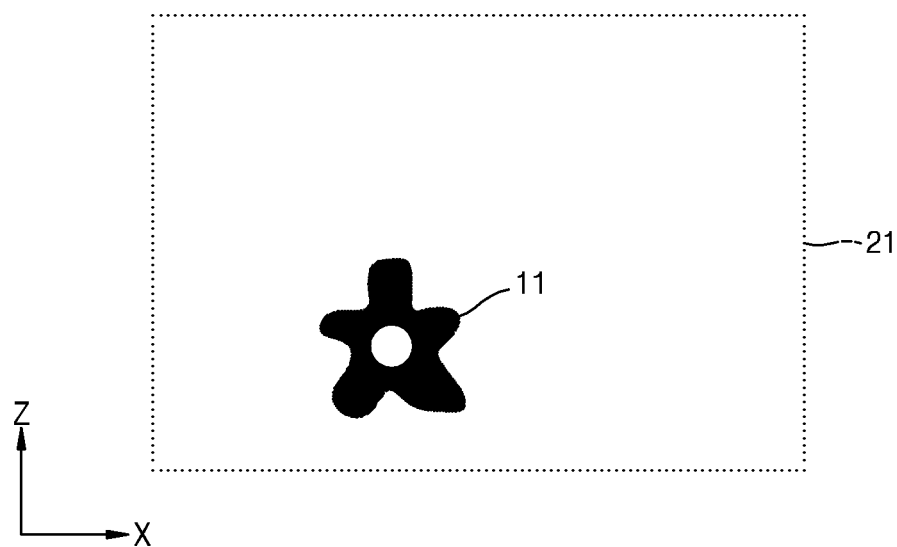
FIGS. 4A and 4B illustrate processes whereby the event occurring region detector of FIG. 1 detects an event occurring region from an image obtained by a first image sensor.
Figure 4B:
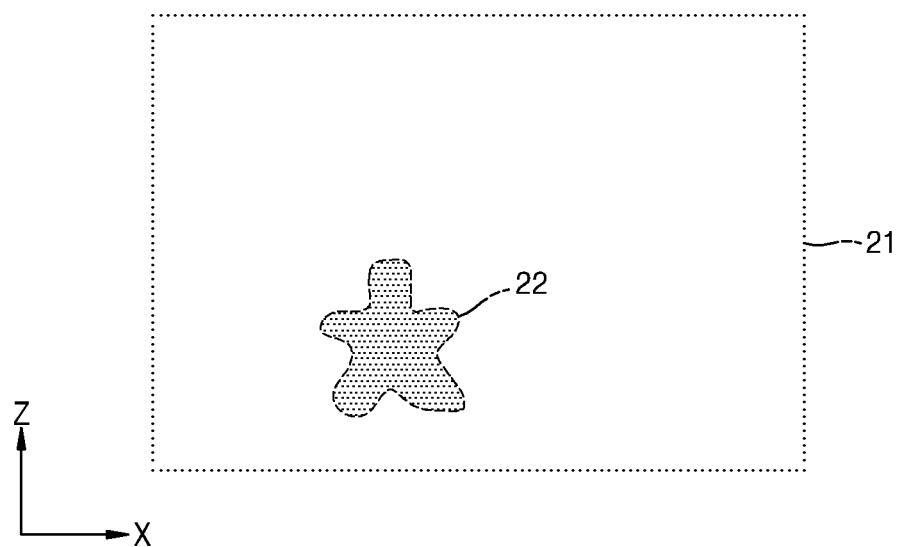

FIGS. 4A and 4B illustrate processes whereby the event occurrence region detector 20 of FIG. 1 detects an event occurrence region from an image obtained by the first image sensor 2.

Referring to FIG. 4A, the event occurring region detector 20 may detect a region, a pixel property of which varies by as much as a predetermined critical value or greater, in an image 21 obtained by using the first image sensor 2 as a motion area. The pixel property may include brightness, color temperature, R, G, B, etc., and may be set by the user according to a kind of the event to be detected. Also, the critical value may be set by the user. The above motion area denotes a region where the event 11 has occurred, and the event occurring region detector 20 may detect the corresponding region as an event occurring region 22 as shown in FIG. 4B. The detected event occurring region 22 may be used to determine whether to move the identification unit 3 that will be described later.

In a case where the detected event occurring region 22 (see FIG. 4B) satisfies preset conditions, the identification unit mover 30 according to the embodiment of the present disclosure may move the identification unit 3 on which the second image sensor 7 is mounted to a direction corresponding to the detected event occurring region 22 (see FIG. 4B). The preset condition may define that the number of pixels included in the event occurring region 22 (see FIG. 4B) is equal to or less than a preset first critical number.

For example, according to an example, the preset condition for the identification unit mover 30 to move the identification unit 3 may define that the number of pixels included in the event occurring region 22 (see FIG. 4B) is equal to or less than the preset first critical number. In this case, the identification unit mover 30 calculates the number of pixels included in the event occurring region 22 (see FIG. 4B) detected by the event occurring region detector 20, and determines whether the number of pixels is equal to or less than the preset critical number. The critical number may be set by the user according to purpose of usage, and may vary depending on the kind of event to be monitored.

If the event has a small scale (a subject that makes the event occur has a small size) or if a location where the event has occurred is apart a large distance from the first image sensor 2, the number of pixels included in the event occurring region 22 may be equal to or less than the preset critical number. In either of the above two cases, a detailed image of the event may not be obtained due to a limitation in a resolution of the first image sensor 2. In this case, the identification unit mover 30 may move the identification unit 3 to which the second image sensor 7 is attached to a direction in which the event has occurred in order to obtain an exact image of the event, and the identification unit 3 may photograph the portion where the event has occurred from a close distance. Here, the event occurring direction detected by the directional sensor 4 of FIG. 2 may be used.

According to another example, the preset condition for the identification unit mover 30 to move the identification unit 3 may define that a shape of an object in the event occurring region 22 (see FIG. 4B) is not similar to a shape stored in advance. The shape stored in advance may be updated through learning. In this case, the identification unit mover 30 may determine whether the shape of the object in the event occurring region 22 (see FIG. 4B) detected by the event occurring region detector 20 is similar to the shape stored in advance. If there is no similar shape to that of the object from among shapes obtained through learning, the identification unit mover 30 may move the identification unit 3 to which the second image sensor 7 is attached to the direction in which the event has occurred in order to obtain an accurate image of the event. Here, the event occurring direction detected by the directional sensor 4 of FIG. 2 may be used.

For example, in a case where the shapes stored in advance include shapes of a plurality of cars and do not include a shape of a human being and the event occurring region 22 (see FIG. 4B) detected by the event occurring region detector 20 includes the shape of a human being, the identification unit mover 30 may move the identification unit 3 to the direction in which the event has occurred in order to obtain an accurate image of the event.

Determination of the similar shape may be performed by a pattern matching method, but the present disclosure is not limited thereto.

Figure 5:
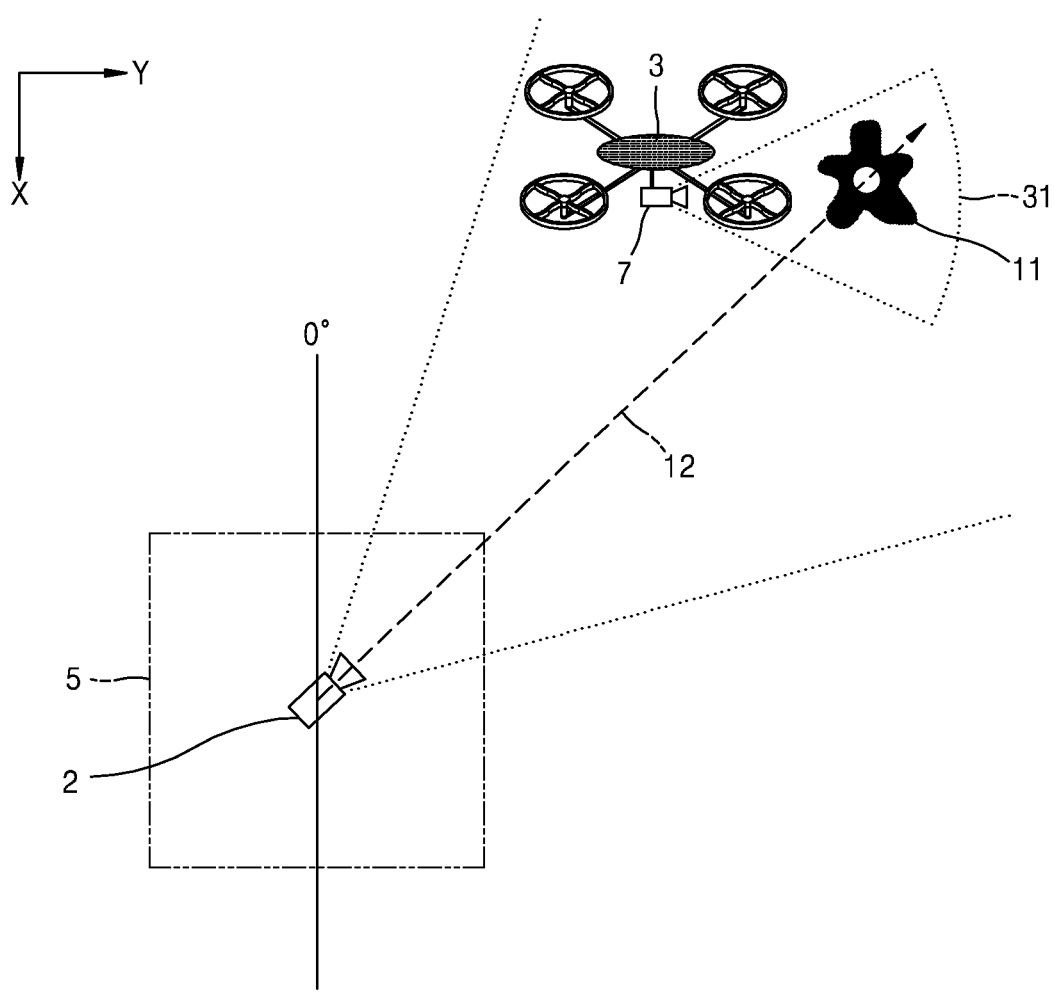
FIG. 5 illustrates a process of obtaining an event image by the identification unit of FIG. 1 according to control of an identification unit mover.

FIG. 5 illustrates a process in which the identification unit 3 of FIG. 1 obtains an event image according to control of the identification unit mover 30.

It is assumed that the event 11 accompanying with sound has occurred in an arrow direction 12, the first image sensor 2 changes a photographing direction according to the event occurring direction 12 detected by the direction detector 10 of FIG. 1, and the number of pixels included in the event occurring region is equal to or less than a preset critical number.

The identification unit mover 30 may move the identification unit 3 to the event occurring direction 12. The identification unit 3 may include the second image sensor 7 for obtaining an event image. The identification unit mover 30 photographs the event 11 so that the event occurring region is always included in a photographing range 31 of the second image sensor 7 while moving the identification unit 3 in the event occurring direction 12, and then, transfers the photographed image to the surveillance device 1 of FIG. 1 in real time. Here, the identification unit mover 30 may move the identification unit 3 until the number of pixels included in the event occurring region detected from the image photographed by the second image sensor 7 becomes equal to or greater than the preset critical number. In addition, the critical number may be set by the user according to the purpose of usage, and may vary depending on the kind of event to be monitored.

In addition, the identification unit mover 30 may calculate a maximum moving distance of the identification unit 3 in the direction corresponding to the event occurring region by using remaining energy information of the identification unit 3. The remaining energy information of the identification unit 3 may include charging information of a battery for driving the identification unit 3, and remaining fuel capacity information. The identification unit 30 may calculate the maximum moving distance based on an average energy consumption amount of the identification unit 3 per unit distance. For example, in a case where the identification unit 3 is a flying object such as a drone that is driven by a battery power, the identification unit mover 30 may calculate the maximum moving distance based on remaining battery capacity information of the drone and an average energy consumption amount of the drone per unit distance.

The identification unit mover 30 may estimate the number of pixels included in the event occurring region in an image obtained by using the second image sensor 7, when the identification unit 3 is moved to the maximum moving distance that is calculated. In detail, the identification unit mover 30 may calculate the number of pixels included in the event occurring region 22 (see FIG. 4B) in the image obtained by using the first image sensor 2 as described above, and may estimate the number of pixels included in the event occurring region in the image obtained by using the second image sensor 7 taking into account the calculated number of pixels and the maximum moving distance of the identification unit 3. Here, relation between the estimated number of pixels and the distance may be obtained through experiments. For example, the estimated number of pixels may be in proportional to a value that is obtained by multiplying the number of pixels included in the event occurring region by a square of the maximum moving distance.

When the estimated number of pixels is equal to or less than a second critical number, the identification unit mover 30 may obtain images from another surveillance device that is adjacent to the surveillance device 1 including the first image sensor 2. Another surveillance device may include a 1-1 image sensor and a 2-1 image sensor. Accordingly, when the estimated number of pixels is equal to or less than the preset second critical number, the identification unit mover 30 may obtain images from the 1-1 image sensor and the 2-1 image sensor. That is, the surveillance device 1 according to the embodiment of the present disclosure may obtain event images in cooperation with one or more adjacent surveillance devices (not shown). Accurate event images may be obtained through cooperation among the surveillance devices.

Figure 6:
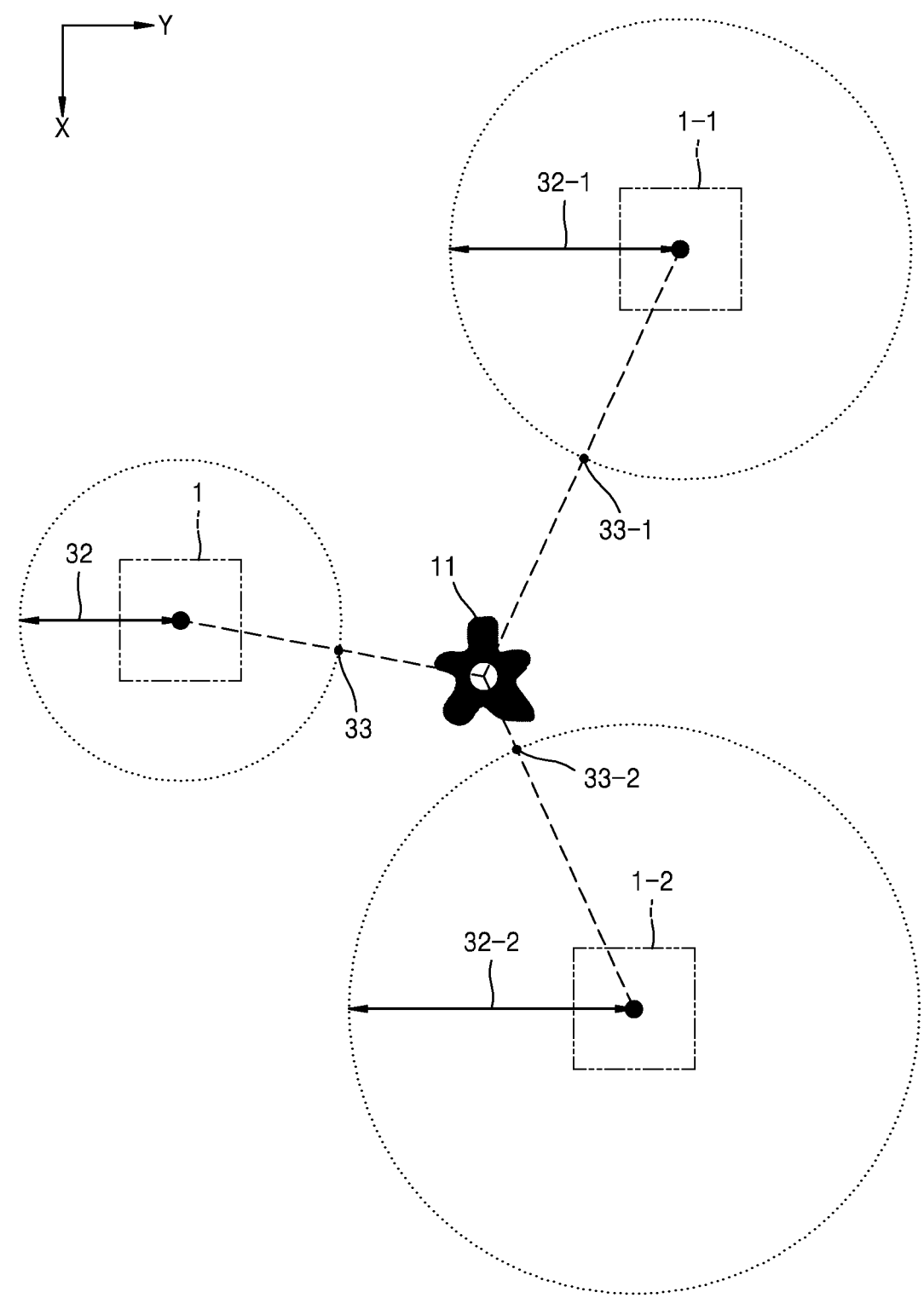
FIG. 6 illustrates that a surveillance device according to an embodiment of the present disclosure cooperates with other adjacent surveillance devices.

FIG. 6 illustrates that the surveillance device 1 according to an embodiment of the present disclosure cooperates with other adjacent surveillance devices.

It is assumed that an event 11 has occurred among three surveillance devices 1, 1-1, and 1-2, and one surveillance device 1 has sensed the event. In this case, the identification unit mover 30 of the surveillance device 1 may calculate a maximum moving distance 32. Also, when the identification unit 3 is moved to the calculated maximum moving distance 32, the identification unit mover 30 of the surveillance device 1 may estimate the number of pixels in the event occurring region from the image obtained by using the second image sensor 7. That is, when the identification unit 3 is moved to a maximum point 33 in a direction in which the event has occurred, the identification unit mover 30 of the surveillance device 1 may estimate the number of pixels included in the event occurring region in the image obtained by using the second image sensor 7 of the identification unit 3. Here, if the number of pixels estimated by the identification unit mover 30 of the surveillance device 1 is equal to or less than the preset second critical number, the surveillance device 1 may obtain images from first and second image sensors of one or more adjacent surveillance devices 1-1 and 1-2.

If the surveillance device 1-1 receives a command for obtaining image from the surveillance device 1, the surveillance device 1-1 may estimate the number of pixels included in an event occurring region from an image obtained according to a maximum moving distance 32-1 and a corresponding point 33-1 as described above.

Also, if the number of pixels estimated by the identification unit mover of the surveillance device 1-1 is equal to or less than the preset second critical number, the surveillance device 1-1 may transmit a command for obtaining image to the adjacent surveillance device 1-2. In this case, the surveillance device 1-2 may estimate the number of pixels included in an event occurring region from an image obtained according to a maximum moving distance 32-2 and a corresponding point 33-2 as described above.

In addition, when the number of pixels included in the event occurring region from an image obtained by the second image sensor in the identification unit of the surveillance device 1-2 is equal to or greater than the preset second critical number, the identification unit mover 30 of the surveillance device 1 may obtain an event image from the second image sensor of the surveillance device 1-2.

Through the above processes, the surveillance device 1 may obtain optimal image of the event 11.

Referring back to FIG. 1, the information provider 40 may expand a part of the image obtained by the second image sensor 7, wherein the part corresponds to the event occurring region in the image obtained by using the first image sensor 2, and provide the expanded image to the user.

Figure 7:
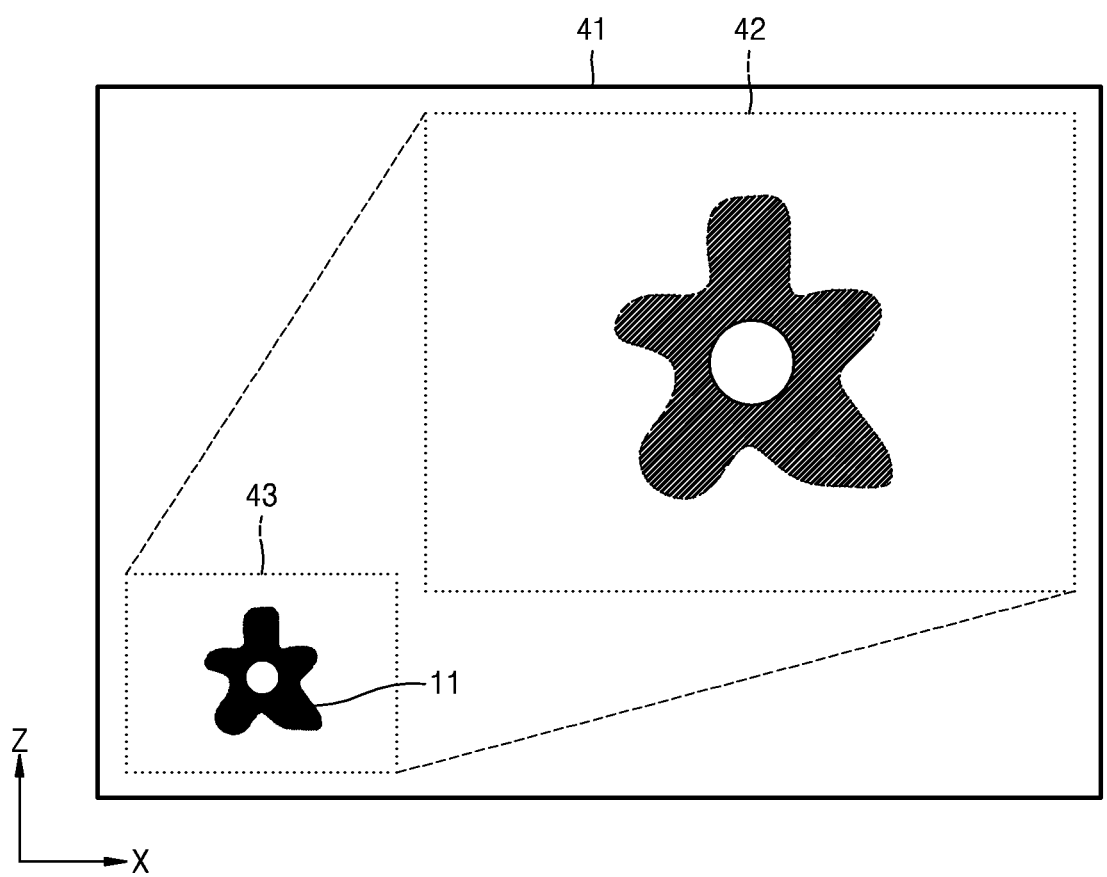
FIG. 7 is an example of a screen showing images obtained via a first image sensor and a second image sensor, wherein the screen is provided to a user by an information provider of FIG. 1.

FIG. 7 is an example of a screen showing images obtained by using the first image sensor 2 and the second image sensor 7, wherein the screen is provided to a user by the information provider 40 of FIG. 1.

The information provider 40 may provide the user with an image 41 obtained by using the first image sensor 2, and an image 42 obtained by using the second image sensor 7, wherein the image 42 is an image expanding a part 43 including the event occurring region where the event 11 has occurred in the image 41. In addition, besides the above-described method of expanding a part of the image including the event occurring region and providing the expanded image to the user, various methods such as a method of splitting a screen and providing two images simultaneously, a method of only providing the image obtained by using the second image sensor 7, etc. may be used.

Figure 8:
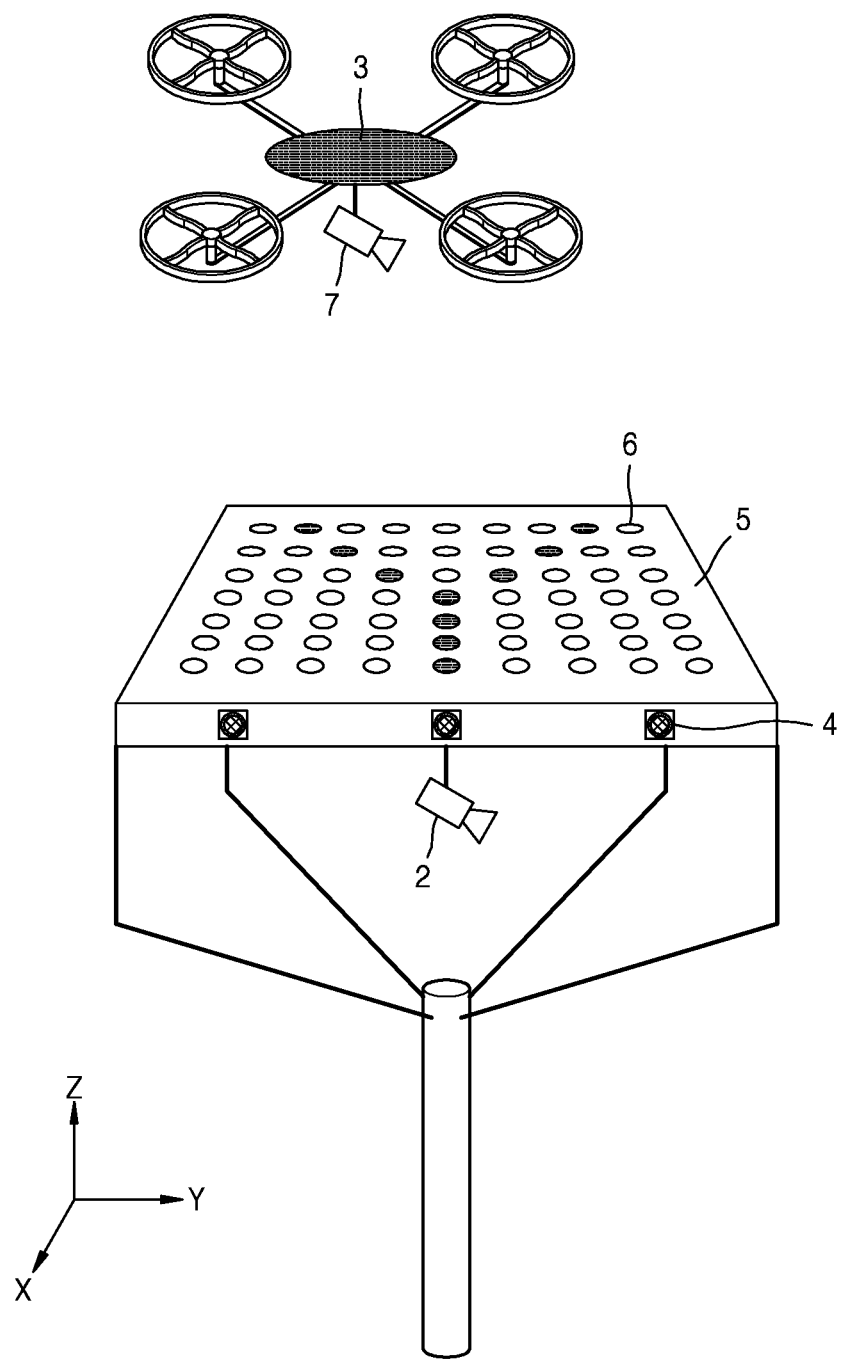
FIGS. 8, 9A and 9B are diagrams illustrating processes whereby a landing guide unit obtains information about alignment state of an identification unit and an identification unit mounting deck from an image obtained by a second image sensor and determines a moving direction to guide landing.

FIGS. 8 and 9 are diagrams illustrating processes, in which the landing guide unit 50 obtains information about arrangement of the identification unit 3 and the identification unit mounting deck 5 from the image obtained by using the second image sensor 7 and determines the moving direction to guide the landing.

Referring to FIG. 8, the landing guide unit 50 may obtain information about the arrangement of the identification unit 3 and the identification unit mounting deck 5 by detecting a symbol represented by the identification unit guide unit 6 included in the identification unit mounting deck 5 in the image obtained by the second image sensor 7 of the identification unit 3.

In detail, the landing guide unit 50 may determine the direction to which the identification unit 3 has to move by comparing the symbol represented by the identification unit guide unit 6 with location of a preset symbol, in the image obtained by using the second image sensor 7.

Figure 9A:
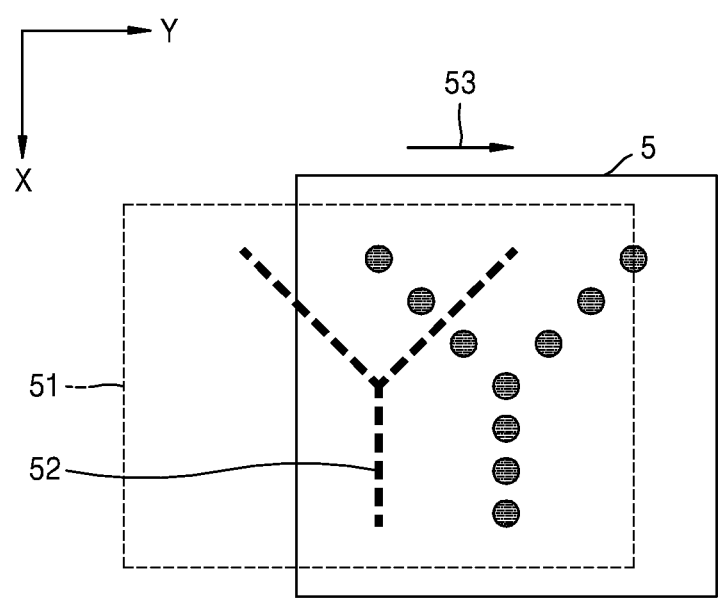

FIG. 9A shows an example, in which the identification unit 3 is located at a left portion of the identification unit mounting deck 5. In an image 51 obtained by using the second image sensor 7 (a view of the image is denoted by the dashed line), the symbol represented by the identification unit guide unit 6 is located at a right side of the image. That is, the location of symbol in the image is located at right of a symbol location 52 for right landing. Therefore, the landing guide unit 50 may obtain information that the identification unit 3 is located at a left portion of the identification unit mounting deck 5 and the identification unit 3 has to be moved to a right direction 53 for landing.

Figure 9B:
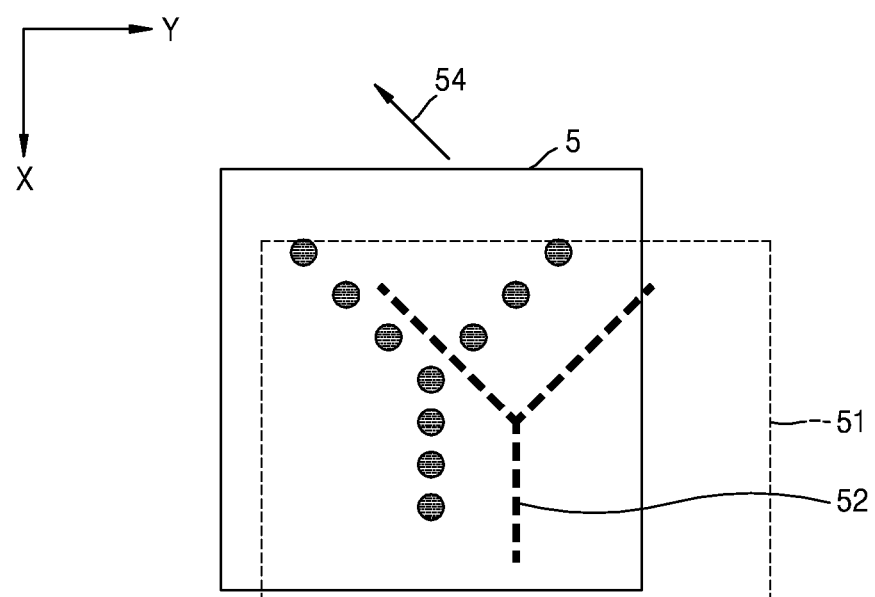

Similarly, FIG. 9B shows an example in which the identification unit 3 is located at lower right side of the identification unit mounting deck 5. In the image 51 obtained by using the second image sensor 7 (a view of the image is denoted by the dashed line), a symbol represented by the identification unit guide unit 6 is located at an upper left portion of the image. That is, the location of symbol in the image is located at an upper left portion of a symbol location 52 for right landing. Therefore, the landing guide unit 50 may obtain information that the identification unit 3 is located at a lower right portion of the identification unit mounting deck 5 and the identification unit 3 has to be moved to an upper left direction 54 for landing.

In addition, even in a case where the identification unit 3 rotates about an altitude direction (Z-axis of FIG. 1) and is not aligned with the identification unit mounting deck 5, the landing guide unit 50 may obtain information that the identification unit 3 has to rotate in a clockwise direction or a counter-clockwise direction by comparing a location of the preset symbol with a location and a direction of the symbol obtained from the image.

Referring back to FIG. 1, the landing guide unit 50 detects light intensity of the identification unit guide unit 6 included in the identification unit mounting deck 5 in the image obtained by using the second image sensor 7 in order to obtain information about altitude of the identification unit 3.

Figure 10:
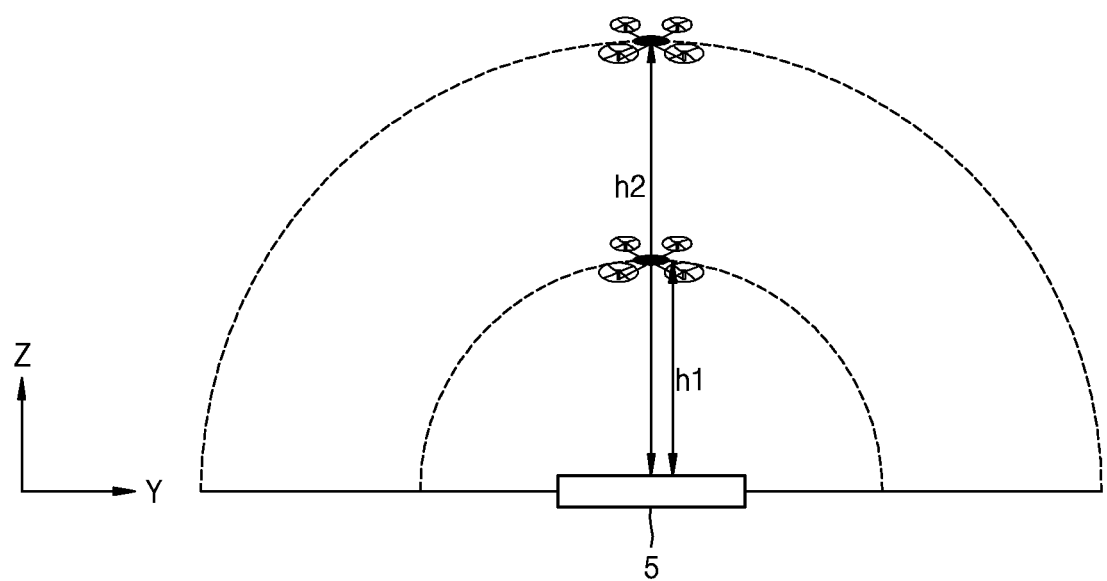
FIG. 10 is a diagram illustrating a process whereby a landing guide unit detects an intensity of light irradiated by an identification unit guide unit from an image obtained by a second image sensor and calculates an altitude of the identification unit.

Referring to FIG. 10, the landing guide unit 50 may detect an intensity of light irradiated by the identification unit guide unit 6 included in the identification unit mounting deck 5 in the image obtained by using the second image sensor 7 included in the identification unit 3, and then may calculate altitudes $h_1$ and $h_2$ of the identification unit 3.

In more detail, the landing guide unit 50 detects the light intensity of the identification unit guide unit 6 from the image, and may obtain information about the altitude of the identification unit 3 by using a preset relation between the light intensity and the distance and the detected light intensity.

The light intensity denotes an amount of light passing through a unit area per unit time duration, wherein the unit area is perpendicular to a direction of the light and placed apart a unit distance from a light source. Therefore, as away from the light source, the amount of light passing through the unit area reduces and the light intensity decreases. When it is assumed that the light intensity is L, the distance is h, and a proportional constant is k, a relation between the light intensity and the distance may be expressed by equation 1 below.

$$L \propto \frac{k}{h^2} \qquad \text{[Equation 1]}$$

The landing guide unit 50 measures the light intensity according to brightness of the identification unit guide unit 6 at a few test altitudes to calculate and store the proportional constant k in advance, and then, may exactly calculate the altitude from the image obtained by the second image sensor 7.

Referring to FIG. 10, a variation in the light intensity according to a variation in the altitude as expressed in Equation 1 above may be expressed by Equation 2 below.

$$\frac{L_{h2}}{L_{h1}} = \frac{\frac{k}{h_2^2}}{\frac{k}{h_1^2}} = \frac{h_1^2}{h_2^2} \qquad \text{[Equation 2]}$$

With respect to a first altitude $h_1$ and a second altitude $h_2$ based on the identification unit mounting deck 5, when $h_2$ is twice as large as $h_1$, the variation in the light intensity according to the variation in the altitude may be calculated by Equation 3 below.

$$\frac{L_{h2}}{L_{h1}} = \frac{\frac{k}{h_2^2}}{\frac{k}{h_1^2}} = \frac{h_1^2}{h_2^2} = \frac{h_1^2}{(2h_1)^2} = \frac{1}{4} \qquad \text{[Equation 3]}$$

That is, the light intensity $L_2$ at the second altitude $h_2$ that is twice as high as the first altitude $h_1$ is ¼ of the light intensity $L_1$ at the first altitude $h_1$.

The landing guide unit 50 may guide the landing of the identification unit 3 by using the information about the arrangement state and the information about the altitude. For example, the landing guide unit 50 may control the identification unit 3 in a horizontal direction by using the information about the arrangement between the identification unit 3 and the identification unit mounting deck 5, and may control the identification unit 3 to be gradually lowered by using the information about the altitude.

In addition, in a case where the identification unit 3 takes off from the identification unit mounting deck 5 by the identification unit mover 30, the landing guide unit 50 may control the identification unit 3 by using the above information.

Hereinafter, another embodiment of the present disclosure will be described below.

According to another embodiment of the present disclosure, the event occurring region detector 20 of FIG. 1 may detect an event occurring region from an image obtained by using the first image sensor 2 having a viewing angle of 360°. The direction detector 10 may detect an event occurring direction taking into account a location of the event occurring region in the image obtained by using the first image sensor 2. If the event occurring region satisfies a preset condition, the identification unit mover 30 may move the identification unit 3 on which the second image sensor 7 is placed in a direction corresponding to the event occurring region. The information provider 40 may provide a user with a region corresponding to the event occurring region in the image obtained by using the first image sensor 2, after expanding the region in the image obtained by using the second image sensor 7.

In the previous embodiment, an additional directional sensor 4 is used to detect the direction in which the event has occurred due to a restricted viewing angle 13 (see FIG. 3) of the first image sensor 2. However, according to the present embodiment, the first image sensor 2 having no restriction in the viewing angle (viewing angle of 360°) is used, and thus, information about the direction in which the event has occurred may be obtained from the image.

That is, the direction detector 10 may detect the event occurring direction based on the image obtained by using the first image sensor 2, and the identification unit mover 30 may move the identification unit 3 on which the second image sensor 7 is mounted in the event occurring direction obtained by the direction detector 10 from the image.

Figure 11A:
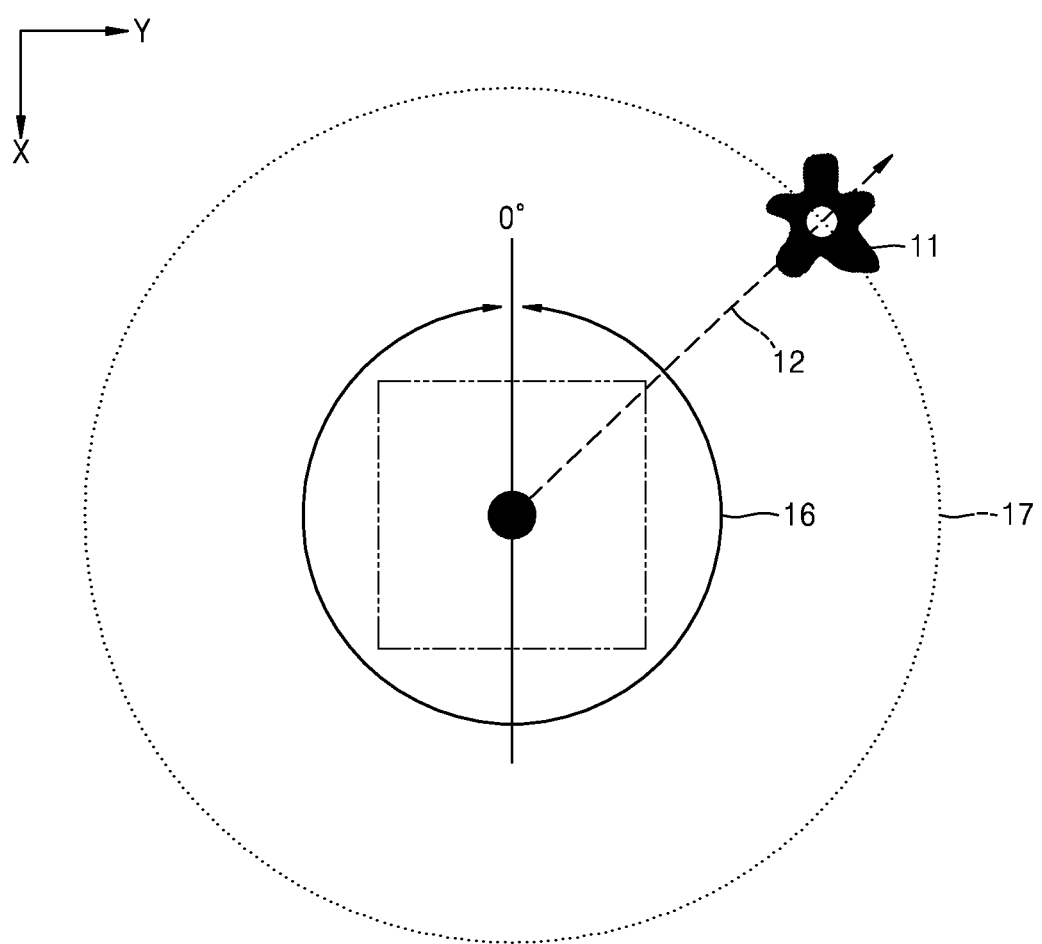
FIGS. 11A and 11B illustrate a method used by a direction detector of a surveillance device according to another embodiment of the present disclosure to detect an event occurring direction from an image obtained via a first image sensor.
Figure 11B:

FIGS. 11A and 11B illustrate a method in which the direction detector 10 of the surveillance device 1 according to another embodiment of the present disclosure detects an event occurring direction from an image obtained by the first image sensor 2.

Referring to FIG. 11A, the first image sensor 2 has a viewing angle 16 of 360° angle, and accordingly, a photographing range may be also 360° angle. Here, when the event 11 accompanying with the sound has occurred in an arrow direction 12, the first image sensor 2 may obtain an image including the event without rotating additionally. That is, the first image sensor 2 may obtain an image 18 having a viewing angle of 360° as shown in FIG. 11B. Here, the event occurring region detector 20 may detect the event occurring region from the image 18 obtained by using the first image sensor 2 in the same manner as the above embodiment. The direction detector 10 may detect an event occurring direction taking into account a location 19 of the event occurring region in the image 18 obtained by using the first image sensor 2. Although FIG. 11B shows the image 18 as a panorama image, but the image 18 is not limited to the panorama image, and an image captured by using a fisheye lens may be used.

In the surveillance device 1 according to another embodiment of the present disclosure, the identification unit mover 30, the information provider 40, and the landing guide unit 50 are the same as those of the previous embodiment, and detailed descriptions thereof are omitted.

Hereinafter, another embodiment of the present disclosure will be described below.

The event occurring region detector 20 according to another embodiment of the present disclosure may control a photographing direction of the first image sensor 2 so that the first image sensor 2 may photograph an opposite side to the event occurring direction. In the above embodiment, when an event has occurred, the first image sensor 2 and the second image sensor 7 photograph the same direction, and a remaining portion that may not be photographed may not be monitored. In the present embodiment, when an event has occurred, the photographing directions of the first image sensor 2 and the second image sensor 7 are controlled opposite each other so as to minimize an empty portion there is no surveillance.

Figure 12A:
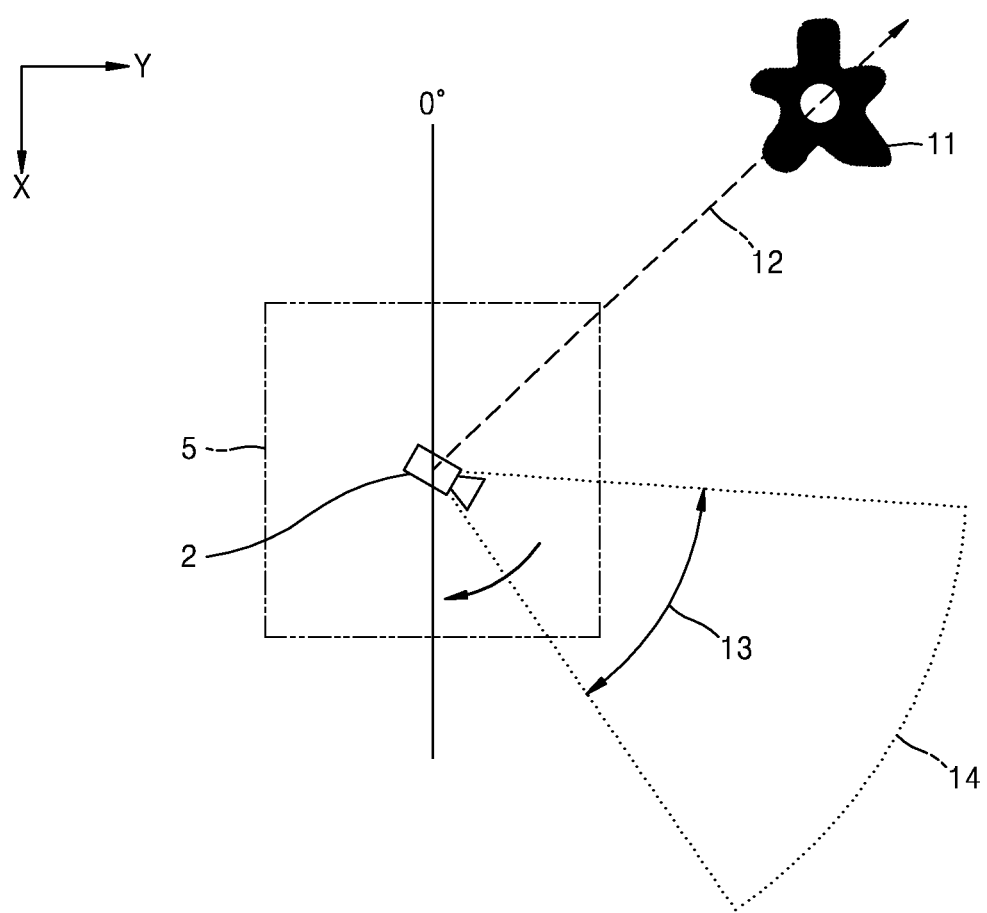
FIGS. 12A and 12B illustrate processes whereby an event occurring region detector according to another embodiment of the present disclosure obtains an image at a direction opposite an event occurrence direction detected by a direction detector.
Figure 12B:
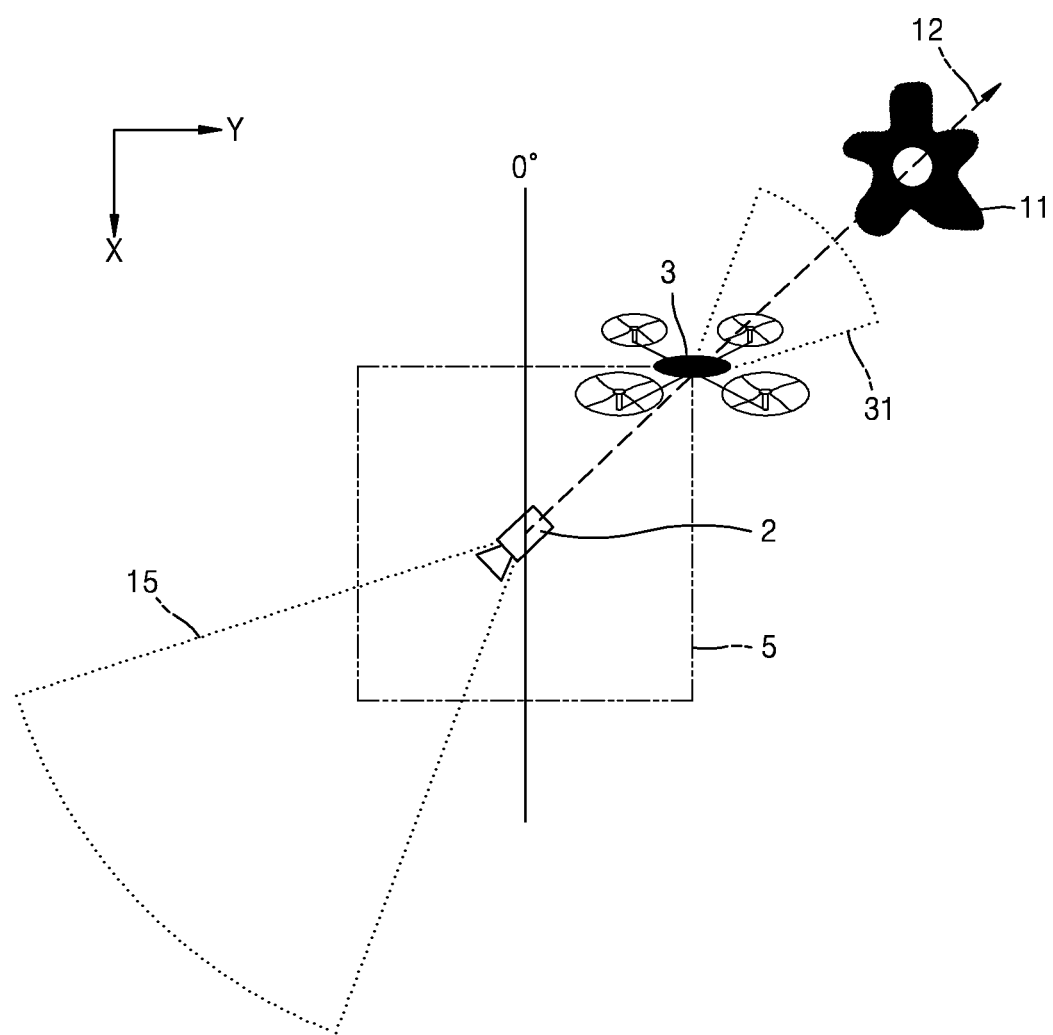

FIGS. 12A and 12B illustrate processes in which an event occurring region detector 20 according to another embodiment of the present disclosure obtain an image at a direction opposite an event occurrence direction detected by a direction detector 10.

Referring to FIG. 12A, it is assumed that the event 11 accompanying with the sound has occurred in the arrow direction 12, while the first image sensor 2 is photographing a direction of 150° angle direction (based on that -X direction is 0° angle, and rotation is in a clockwise direction.) A viewing angle 13 of the first image sensor 2 is restricted. In the previous embodiment, due to the restricted viewing angle 13 of the first image sensor 2, the event occurring region detector 20 rotates the first image sensor 2 in the event occurring direction 12 so that the first image sensor 2 may have a photographing range 15 suitable for photographing the event 11.

In the present embodiment, when the event 11 has occurred, the event occurring region detector 20 may rotate the first image sensor 2 in a direction opposite the event occurring direction 12. Also, the identification unit mover 30 may move the identification unit 3 on which the second image sensor 7 is mounted to the event occurring direction, and at this time, the event occurring region detector 20 may detect an event occurring region from an image obtained by using the second image sensor 7.

That is, the event occurring region detector 20 obtains an event image from the image obtained by using the second image sensor 7, and remaining part is monitored by using the first image sensor 2 to reduce a part that is not being monitored. Also, the event occurring region detector 20 may ensure expanded photographing ranges 15 and 31 by controlling the first image sensor 2 and the second image sensor 7 to photograph opposite directions.

Figure 13:
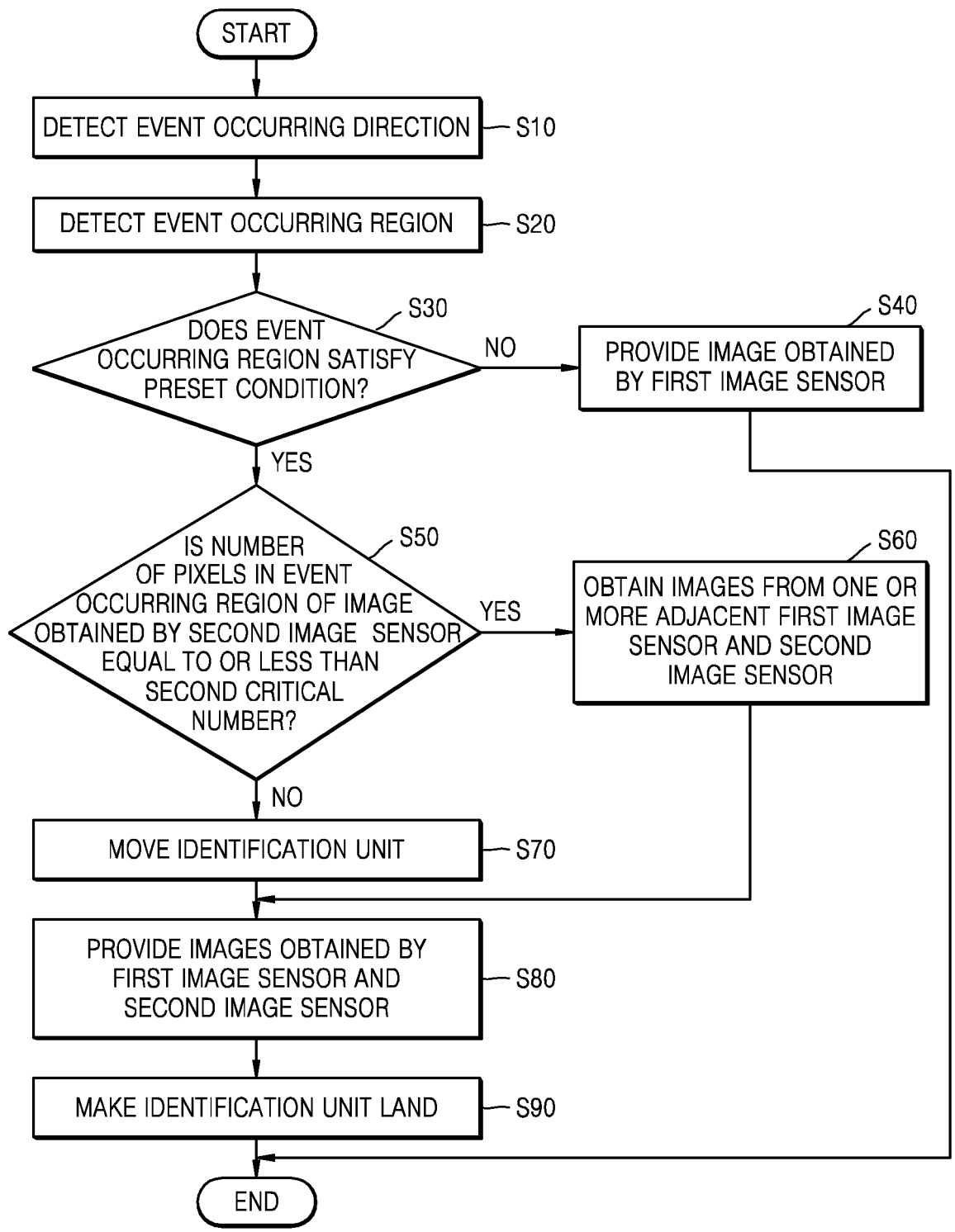
FIG. 13 is a flowchart of a surveillance method according to an embodiment of the present disclosure.

A surveillance method illustrated in FIG. 13 may be executed by the surveillance device 1 of FIG. 1. Hereinafter, descriptions about the same elements as those illustrated above with reference to FIGS. 1 to 13 will be omitted.

The direction detector 10 may detect an event occurring direction by using a directional sensor 4 (S10). The direction detector 10 may calculate an energy average of signals obtained by the directional sensors 4 arranged in different directions from one another, and may detect an event acoustic signal, an energy average of which is equal to or greater than a preset critical energy. Also, the direction detector 10 may detect a direction in which the directional sensor 4 obtaining the event signal is arranged as an event occurring direction. Here, the critical energy may be set by the user.

The event occurring region detector 20 may detect a region where an event occurs in an image obtained by the first image sensor 2 (S20). The event occurring region detector 20 rotates the first image sensor 2 in the event occurring direction detected by the direction detector 10 so that the first image sensor 2 may have a photographing range that is suitable for photographing the event. Also, the event occurring region detector 20 may detect a motion area, in which a pixel property has changed, in the image obtained by using the first image sensor 2. Here, the pixel property may include brightness, color temperature, R, G, B, etc., and may be set by the user according to a kind of the event to be detected. Such a motion area is a portion where the event has occurred, and the event occurring region detector 20 may detect the corresponding area as the event occurring region. The detected event occurring region may be used to determine whether to move the identification unit 3 that will be described later.

The identification unit mover 30 may determine whether the event occurring region satisfies a preset condition (S30). Here, the preset condition may define that the number of pixels included in the event occurring region is equal to or less than a preset first critical number or a shape of an object in the event occurring region is not similar to a shape that is stored in advance. If the event occurring region does not satisfy the preset condition, the identification unit mover 30 may not move the identification unit 3. Also, in this case, the information provider 40 may only provide the image obtained by using the first image sensor 2 (S40).

When the event occurring region satisfies the preset condition, the identification unit mover 30 may estimate the number of pixels included in the event occurring region in an image obtained by the identification unit 3 at a maximum moving distance based on the information about remaining energy of the identification unit 3, on which the second image sensor 7 is mounted, and may determine whether the estimated number of pixels is equal to or less than the second critical number (S50). When the event occurring region satisfies the preset condition, the number of pixels included in the event image may be too small to identify the event or the object in the event image is not similar to the shape stored in advance and thus is determined to be a suspicious object. In this case, the identification unit mover 30 needs to move the identification unit 3 to the event occurring direction to obtain the image including the corresponding event, and then, it may be difficult to obtain an accurate event image due to a restricted energy of the identification unit 3. Therefore, in order to obtain the event image more accurately, the identification unit mover 30 may obtain the event image in cooperation with one or more adjacent surveillance devices 1 based on the remaining energy information of the identification unit 3. In detail, the identification unit mover 30 calculates a maximum moving distance of the identification unit 3 in the direction corresponding to the event occurring region by using remaining energy information of the identification unit 3. The identification unit mover 30 estimates the number of pixels included in the event occurring region in an image obtained by using the second image sensor 7, when the identification unit 3 is moved to the maximum moving distance.

When the estimated number of pixels is equal to or less than the preset second critical number, the identification unit mover 30 may obtain event images from a 1-1 image sensor and a 2-1 image sensor of one or more adjacent surveillance devices 1-1 (S60). Here, the obtained image may be provided to the user via the information provider 40.

In addition, when the estimated number of pixels is equal to or greater than the preset second critical number, the identification unit mover 30 may move the identification unit 3 on which the second image sensor 7 is mounted in a direction corresponding to the event occurring region (S70). In this case, the information provider 40 may provide the user with the region corresponding to the event occurring region in the image obtained by using the first image sensor 2, by expanding the image obtained by using the second image sensor 7 (S80).

When obtaining of the event image is finished, the landing guide unit 50 may guide the identification unit 3 to land on the identification unit mounting deck 5 (S90).

According to the embodiments of the present disclosure, a method and a device capable of determining an event more accurately by analyzing a detailed image obtained by using the identification unit may be implemented.

The surveillance device and method according to the present disclosure may be implemented as computer-readable codes in a computer-readable recording medium. The computer readable recording medium is any data storage device that may store programs or data which may be thereafter read by a computer system. Examples of the computer readable recording medium include read-only memory (ROM), random-access memory (RAM), CD-ROMs, magnetic tapes, floppy disks, optical data storage devices, and so on. The computer readable recording medium may also be distributed over network coupled computer systems so that the computer readable code is stored and executed in a distributive manner. Also, functional programs, codes, and code segments for accomplishing the present disclosure may be easily construed by programmers skilled in the art to which the present disclosure pertains.

While this disclosure has been particularly shown and described with reference to preferred embodiments thereof, it will be understood by those skilled in the art that various changes in form and details may be made therein without departing from the spirit and scope of the disclosure as defined by the appended claims.

The invention claimed is:

1. A surveillance method in a surveillance system, the surveillance method comprising:
   detecting an event occurring region from a first image obtained via a first image sensor; and
   if the event occurring region satisfies a preset condition, moving an identification unit on which a second image sensor is mounted in a direction corresponding to the event occurring region,
   wherein the preset condition is a number of pixels in the event occurring region that is equal to or less than a first critical number that is set in advance,
   wherein the identification unit acquires a second image corresponding to the event occurring region with the second image sensor while moving toward the direction corresponding to the event occurring region, and
   wherein the moving of the identification unit comprises:
      calculating a maximum moving distance of the identification unit in the direction corresponding to the event occurring region by using information about remaining energy of the identification unit;
      when the identification unit is moved to the maximum moving distance, estimating a number of pixels included in the event occurring region in the second image obtained via the second image sensor; and
      when the number of pixels is equal to or less than a preset second critical number, obtaining images from one or more image sensors adjacent to the first image sensor.

2. The surveillance method of claim 1, wherein the preset condition is that a shape of an object in the event occurring region is similar to a shape stored in advance.

3. The surveillance method of claim 1, further comprising:
   detecting an event occurring direction by using a directional sensor,
   wherein the detecting of the event occurring region comprises:
   controlling a photographing direction of the first image sensor so that the first image sensor photographs the first image in the event occurring direction; and
   detecting the event occurring region from the first image obtained by the first image sensor.

4. The surveillance method of claim 3, wherein the directional sensor comprises one or more acoustic sensor arranged in different directions from each other, and
   the detecting of the event occurring direction comprises calculating an energy average of acoustic signals obtained by the one or more acoustic sensors, detecting an event acoustic signal, an energy average of which is equal to or greater than a preset critical energy, and detecting a direction in which an acoustic signal corresponding to the event acoustic signal is arranged as the event occurring direction.

5. The surveillance method of claim 1, further comprising:
detecting an event occurring direction corresponding to the event occurring region based on the first image,
wherein the moving of the identification unit comprises moving the identification unit on which the second image sensor is mounted in the direction corresponding to the event occurring region detected in the detecting of the event occurring direction.

6. The surveillance method of claim 1, wherein the first image sensor is provided on a fixed supporter, and the identification unit is an unmanned flying object.

7. The surveillance method of claim 1, further comprising:
providing a user with the event occurring region in the first image obtained via the first image sensor, after expanding a corresponding part in the second image obtained by using the second image sensor.

8. The surveillance method of claim 1, wherein the identification unit is a flying object capable of landing on a landing field, and
the surveillance method further comprises:
obtaining information about an arrangement state between the identification unit and the landing field by detecting a symbol from a third image obtained via the second image sensor;
obtaining, from the third image, information about an altitude of the flying object by detecting a light intensity of a light-emitting unit provided on the landing field; and
controlling the identification unit based on the information about the arrangement state and the information about the altitude.

9. The surveillance method of claim 8, wherein the landing field is provided on a supporter on which the first image sensor is fixed, the light-emitting unit comprises a plurality of light-emitting devices arranged in column and row directions, and the symbol is represented in a lighting pattern of the plurality of light-emitting devices, and
the obtaining of the information about the altitude comprises:
detecting a light intensity of the light-emitting unit; and
obtaining information about the identification unit based on a relationship between the light intensity and a distance set in advance and the detected light intensity.

10. A surveillance method used by a surveillance system, the surveillance method comprising:
detecting an event occurring direction via a directional sensor;
moving an identification unit on which a second image sensor is mounted in the detected event occurring direction; and
controlling a photographing direction of a first image sensor towards a direction away from the event occurring direction,
wherein the moving of the identification unit comprises;
calculating a maximum moving distance of the identification unit in the direction corresponding to the event occurring region by using information about remaining energy of the identification unit;
when the identification unit is moved to the maximum moving distance, estimating a number of pixels included in the event occurring region in a second image obtained via the second image sensor; and
when the number of pixels is equal to or less than a preset second critical number, obtaining images from one or more image sensors adjacent to the first image sensor.

11. A surveillance device comprising:
an event occurring region detector configured to detect an event occurring region from a first image obtained via a first image sensor; and
an identification unit mover configured to move an identification unit on which a second image sensor is mounted in a direction corresponding to the event occurring region that is detected if the event occurring region satisfies a preset condition,
wherein the preset condition is a number of pixels in the event occurring region that is equal to or less than a first critical number that is set in advance,
wherein the identification unit mover acquires a second image corresponding to the event occurring region with the second image sensor while moving toward the direction corresponding to the event occurring region, and
wherein the identification unit moving is further configured to;
calculate a maximum moving distance of the identification unit in the direction corresponding to the event occurring region by using information about remaining energy of the identification unit,
when the identification unit is moved to the maximum moving distance, estimate a number of pixels included in the event occurring region in the second image obtained via the second image sensor; and
when the number of pixels is equal to or less than a preset second critical number, obtain images from one or more image sensors adjacent to the first image sensor.

12. The surveillance device of claim 11, further comprising:
a direction detector configured to detect an event occurring direction via a directional sensor,
wherein the event occurring region detector is configured to control a photographing direction of the first image sensor to be towards the event occurring direction and to detect the event occurring region from a first image obtained via the first image sensor.

13. The surveillance device of claim 11, further comprising:
an information provider configured to provide a user with the event occurring region in the first image obtained via the first image sensor, after expanding a corresponding part in the second image obtained via the second image sensor.

* * * * *